United States Patent [19] [11] 3,798,352
Ekstrand [45] Mar. 19, 1974

[54] AUTOMATIC TINT CONTROL CIRCUIT

[76] Inventor: Roy A. Ekstrand, 1209 Woodlane, Prospect Heights, Ill. 60070

[22] Filed: Apr. 1, 1971

[21] Appl. No.: 130,095

[52] U.S. Cl. .......... 178/5.4 HE
[51] Int. Cl. .......... H04n 9/12
[58] Field of Search .......... 178/5.4 HE, 5.4 M, 5.4

[56] References Cited

UNITED STATES PATENTS

| | | | |
|---|---|---|---|
| 3,525,802 | 8/1970 | Whiteneir | 178/5.4 HE |
| 3,617,621 | 11/1971 | Cochran | 178/5.4 HE |
| 3,536,827 | 10/1970 | Bell | 178/5.4 HE |
| 3,597,639 | 8/1971 | Harwood | 178/5.4 HE |

*Primary Examiner*—Richard Murray
*Attorney, Agent, or Firm*—Hill, Sherman, Meroni, Gross & Simpson

[57] ABSTRACT

An automatic tint control circuit having means for developing an error signal in response to the deviation of the phase of the chroma signal from a preselected phase such as a flesh tone phase and for using the error signal to recombine with the chroma signal to shift the phase of the chroma signal in a direction toward the predetermined phase. Means are provided to sample a given proportion of the outputs of each of the R-Y and B-Y color difference amplifiers. The proportion of each determines the predetermined phase about which correction is desired. The sample proportion of each is combined and coupled through a transistor circuit to the inputs of both the R-Y and B-Y color demodulators. The result is an extremely simplified circuit for accomplishing the desired phase shift of the chroma signal. The transistor circuit employed includes an arrangement to cancel the error or correction signal when the chroma signal is in a highly saturated green position. This prevents the operation of the correction circuit for colors which are not close to the flesh tone region and which preferably not be shifted. The same circuit arrangement also has means for cancelling the horizontal blanking pulse in the correction signal to avoid interference with DC restoration at the color difference amplifiers.

11 Claims, 11 Drawing Figures

INVENTOR.
ROY A. EKSTRAND

BY Nicholas A. Camasto

ATTORNEYS

INVENTOR.
ROY A. EKSTRAND

BY Nicholas A. Camasto

ATTORNEYS

INVENTOR.
ROY A. EKSTRAND

BY Nicholas A Camasto
ATTORNEYS

PATENTED MAR 19 1974

3,798,352

SHEET 4 OF 4

INVENTOR.
ROY A. EKSTRAND

BY Nicholas A Camasto

ATTORNEYS

AUTOMATIC TINT CONTROL CIRCUIT

BACKGROUND OF THE INVENTION

Description of the Prior Art

Many attempts have been made in the prior art to develop circuits which improve the color ignition for flesh tones in the reception of a color television signal. The eye is particularly sensitive to deviations in the color rendition for flesh tones and the purpose of the prior art circuits have been to shift deviations of colors toward the flesh tone regions. A Dietch U.S. Pat No. 3,301,945 is a basic patent which teaches the synthesis of a color correction signal to the chroma signal for the purpose of improving the color rendition of flesh tones. The Dietch patent, however, teaches the use of phase shifting for all the colors and it does not restrict the area of correction to flesh tones.

A Chatten U.S. Pat. No. 3,255,305 is a related patent which deals with complex circuitry to improve the saturation of certain colors in a color television receiver. The Chatten system however works by sensing the presence of desaturated colors and increasing the saturation of that color or combination of colors which are sensed by a matrix circuit.

A Whiteneir U.S. Pat. No. 3,525,802 also relates to color correction in a television receiver, and especially relates to flesh tone corrections. Like in the Dietch patent, the Whiteneir patent uses color synthesis by adding the phase of a correction signal to the phase of the chroma signal to produce a resultant signal. However, the Whiteneir patent also uses relatively complex gating means to select a certain phase region about the flesh tone phase within color correction is to be obtained. Chroma signals lying outside this selected region are not operated upon in the Whiteneir system.

The present device, however, unlike all the prior devices recognizes that a simple error signal can be developed which bears a first polarity when the chroma signal is at a phase which lies within the region generated by a clockwise 180° rotation of the selected phase 60 in FIG. 4 to 63 in FIG. 4 and a second polarity when the chroma signal is at a phase which lies within the region generated by a counter clockwise rotation of 60 in FIG. 4 to 63 in FIG. 4. It is a simple matter then to use this error signal to produce the required phase shift in the chroma signal. The result is a significantly simplified and significantly lower cost circuit for accomplishing excellent results in color correction to improve flesh tone renditions.

SUMMARY OF THE INVENTION

It is an important feature of the present invention to provide an improved automatic tint control circuit for a color television receiver.

It is another feature of the present invention to provide an automatic tint control circuit for a television receiver which is significantly reduced in cost and which yields a more desirable rendition in the flesh tone region.

It is a principal object of the present invention to provide an automatic tint control circuit for a color television receiver having means for utilizing the outputs of the R-Y and B-Y amplifiers to produce a correction signal which may then be coupled to the R-Y and B-Y color demodulators to produce the desired phase shift.

It is another object of the present invention to provide an automatic tint control circuit as described above wherein the proportion of each of the sampled R-Y and B-Y signals is selected such that the combined signals give a positive polarity for chroma signals which lie on one side of the flesh tone region and a negative polarity for chroma signals which lie on the opposite side of the flesh tone region.

It is a further object of the present invention to provide a simplified automatic tint control circuit as described above wherein means are provided to cancel the correction signal during the presence of the horizontal blanking pulse and during the presence of highly saturated green hues.

It is another object of the present invention to provide means to correct fleshtone errors resulting from the common practice of partially AC coupling color difference signals to the display device.

These and other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF THE PREFERRED EMBODIMENT

Figure 1:
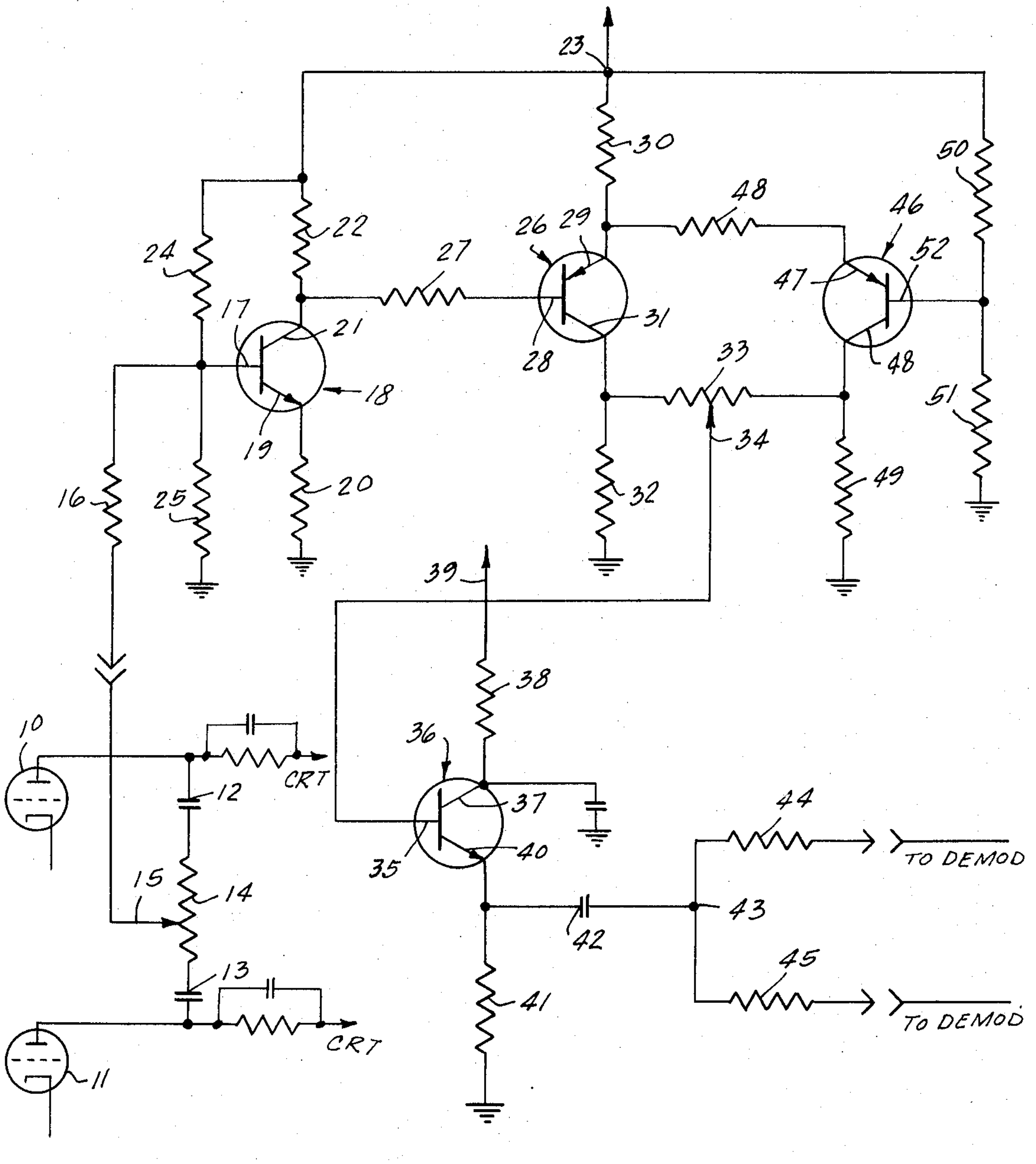
FIG. 1 is a schematic of the automatic tint control circuit of the present invention.

The automatic tint control circuit of the present invention operates from the principle that the R-Y and B-Y color difference amplifiers produce opposite polarity outputs when the chroma signal is in the phase region of flesh tone. This fact makes it possible to develop a correction or an error signal which can be used to move the instantaneous chroma signal within the phase toward the predetermined desired phase regardless of whether the chroma signal is leading or lagging the predetermined phase. The predetermined phase is chosen by selecting given proportions of the outputs of each of the R-Y and B-Y amplifiers so that at the given phase of the chroma signal such as 57°, for instance, the combined outputs of the R-Y and B-Y amplifiers is zero within the phase region. For angles less than 57°, the combined output becomes negative and for angles greater than 57° the combined output becomes positive. Hence, opposite polarity signals are developed which are sensitive to the position of the chroma signal at any instant of time and which may be used to move the chroma signal toward the desired phase angle.

To avoid color correction in regions where such correction is not desired, a cancellation circuit is utilized to cancel the correction signal for large negative excursions such as would be produced during highly saturated green on the picture tube. The cancellation circuit is also utilized to cancel the horizontal blanking pulses to avoid interference with the DC restoration at the color difference amplifiers. Except for these cancellation features, the color correction or error signal is then coupled to the R-Y and B-Y demodulators where they combine with the chroma signal to produce resultant signals in the region of the predetermined phase, the chroma signal being shifted always in the direction of the desired predetermined phase, in this case the flesh tone region.

Referring to the drawings in greater detail, the R-Y amplifier is identified by the reference numeral 10, and the B-Y amplifier is identified by the reference numeral 11. The outputs of the two amplifiers are combined together through a pair of capacitors 12 and 13 to a resistor 14. The resistor 14 has a movable tap 15 which may be adjusted along the length of the resistor to select a given proportion of R-Y output to B-Y output. This proportion selected by the tap 15 determines the phase angle at which there will be zero correction signal. This happens to be the phase angle about which color correction is desired. In the present case, since it is desired to select an angle of approximately 57° which is selected for most favorable flesh tone color rendition, the tap 15 is adjusted to give zero voltage output at the tap when a chroma signal of 57° is received.

The output from the tap 15 is coupled through a resistor 16 to a base 17 of transistor 18. The transistor 18 has an emitter 19 coupled through a resistor 20 to circuit ground, and has a collector 21 coupled through a further resistor 22 to a supply of positive voltage such as 25 volts DC at a point 23. A further resistor 24 is coupled between the voltage supply 23 and the base 17 of the transistor 18. Also, a biasing resistor 25 is coupled from the base 17 to circuit ground. The transistor 18 provides power gain and impedance match into a further transistor 26.

The collector 21 of the transistor 18 has its output coupled through a resistor 27 to a base 28 of the transistor 26. The transistor 26 has an emitter 29 which is coupled through a resistor 30 to the voltage supply 23, and also the transistor 26 has a collector 31 coupled through a resistor 32 to circuit ground.

The output of the transistor 26 is taken from the collector 31 through a resistor 33 and a movable tap 34 to a base 35 of a further transistor 36. The transistor 36 is connected as an emitter follower and has a collector 37 coupled through a resistor 38 to a source of positive DC voltage at 39. The transistor 36 also has an emitter 40 which is coupled through a biasing resistor 41 to circuit ground. The output of the transistor 36 is taken from the emitter 40 and coupled through a capacitor 42 to a circuit point 43. The circuit point 43 is then coupled through respective resistors 44 and 45 to the inputs of the R-Y and B-Y demodulators of the television receiver.

The circuit which is utilized to cancel large correction signal excursions at emitter 29 of transistor 26 such as occur during highly saturated greens and during the horizontal blanking pulse comprises a further transistor 46 which has an emitter 47 coupled through a resistor 48 to the emitter 29 of the transistor 26. The transistor 46 also has a collector 48 coupled through a resistor 49 to circuit ground. The collector 48 is also coupled to the opposite terminal of the resistor 33. Biasing resistors 50 and 51 are coupled as shown from the voltage source 23 and circuit ground respectively to the base circuit 52 of the transistor 46.

Figures 2, 2A, 2B, 2C, 2D:
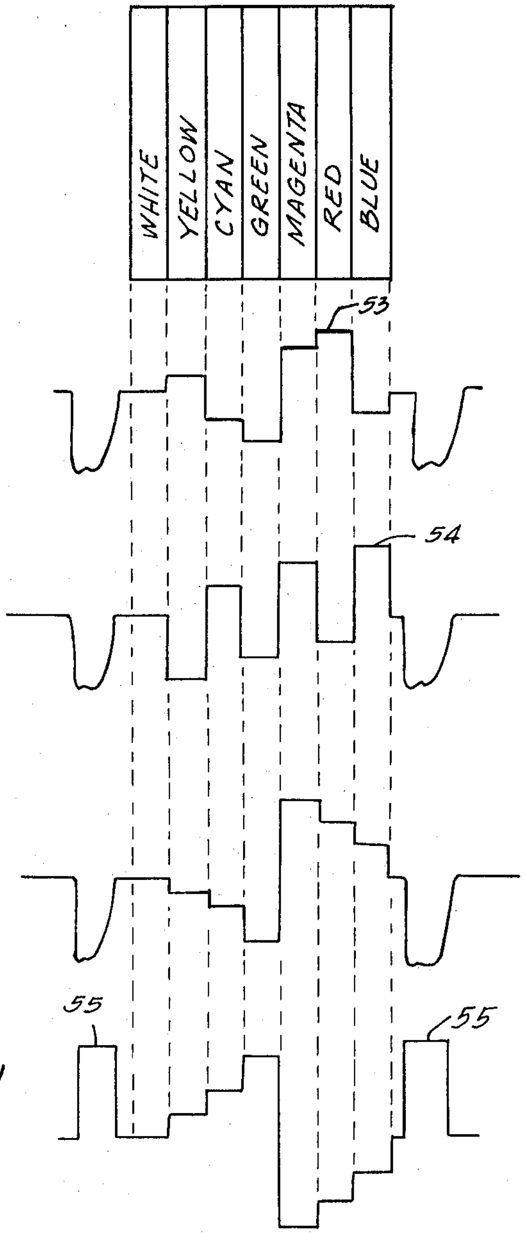
FIGS. 2, 2*a*, 2*b*, 2*c* and 2*d* are illustrations which show the form of the various signals which are present in the circuit of the present invention when the color stripes shown in FIG. 2 are present on the picture tube of a color television receiver.
Figures 3, 3A, 3B, 3C:
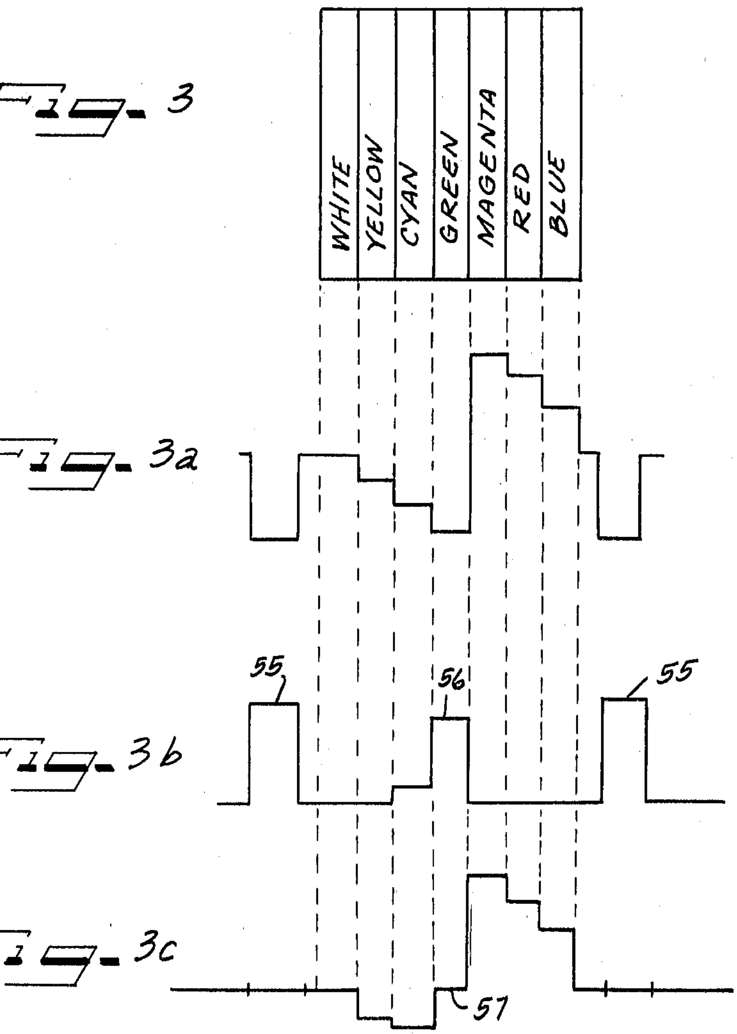
FIGS. 3, 3*a*, 3*b* and 3*c* are similar to FIGS. 2 through 2*d* to illustrate additional signals in the automatic tint control circuit of the present invention.

The operation of the circuits in FIG. 1 can be understood by consideration of the illustrations of FIGS. 2, 2*a* through 2*d*, 3, 3*a* through 3*c*, and FIG. 4. FIG. 1 shows a color bar which is merely a color pattern of vertical stripes which were displayed on the screen of a color television receiver in the pattern shown. FIG. 2*a* shows the R-Y color difference amplifier output and FIG. 3 shows the B-Y color difference amplifier output for the color bar shown in FIG. 2. It is noted for instance that the R-Y waveform has a peak 53 in the region of red, and the B-Y waveform has a peak 54 in the region of blue.

As explained, the center tap 15 selects a given proportion of R-Y and B-Y and combines the two to produce the waveforms shown in FIG. 2*c*. This is the signal that is coupled to the base 17 of the transistor 18.

FIG. 2*d* shows the waveform which appears at the collector of the transistor 18 which essentially is a 180° reversal from that shown in FIG. 2*c*.

FIG. 3 is a repeat of the color bar to assist in following the waveforms of FIGS. 3*a* through 3*c*. FIG. 3*a* shows the waveform which appears at the collector of transistor 26 for the same color bar. This waveform is again a 180° reversal from that shown in FIG. 2*d* and is similar to the waveforms shown in FIG. 2*c*. The waveform shown in FIG. 3*b* appears at the collector of the transistor 46. Here it is to be noted that the transistor 46 is turned on during the time interval occupied by the horizontal blanking pulse 55 and by the time interval occupied by highly saturated green hues 56.

FIG. 3*c* is the signal which appears at the output of the tap 34 and at the base 35 of the transistor 36. This signal is a combination of the signals 3*a* and 3*b*. As shown at the point 57 the strong green signal is substantially cancelled due to the turning on of the transistor 46, and also the blanking pulses 55 are cancelled by the same principle. The resulting error signal will then be coupled to the circuit point 43 at the inputs of the R-Y and B-Y demodulators. Accordingly, it can be seen that the present invention provides a simplified means for developing an error signal which is indicative of the deviation of the chroma signal from a predetermined hue and for using that error signal to produce color correction or automatic tint control.

Figure 4:
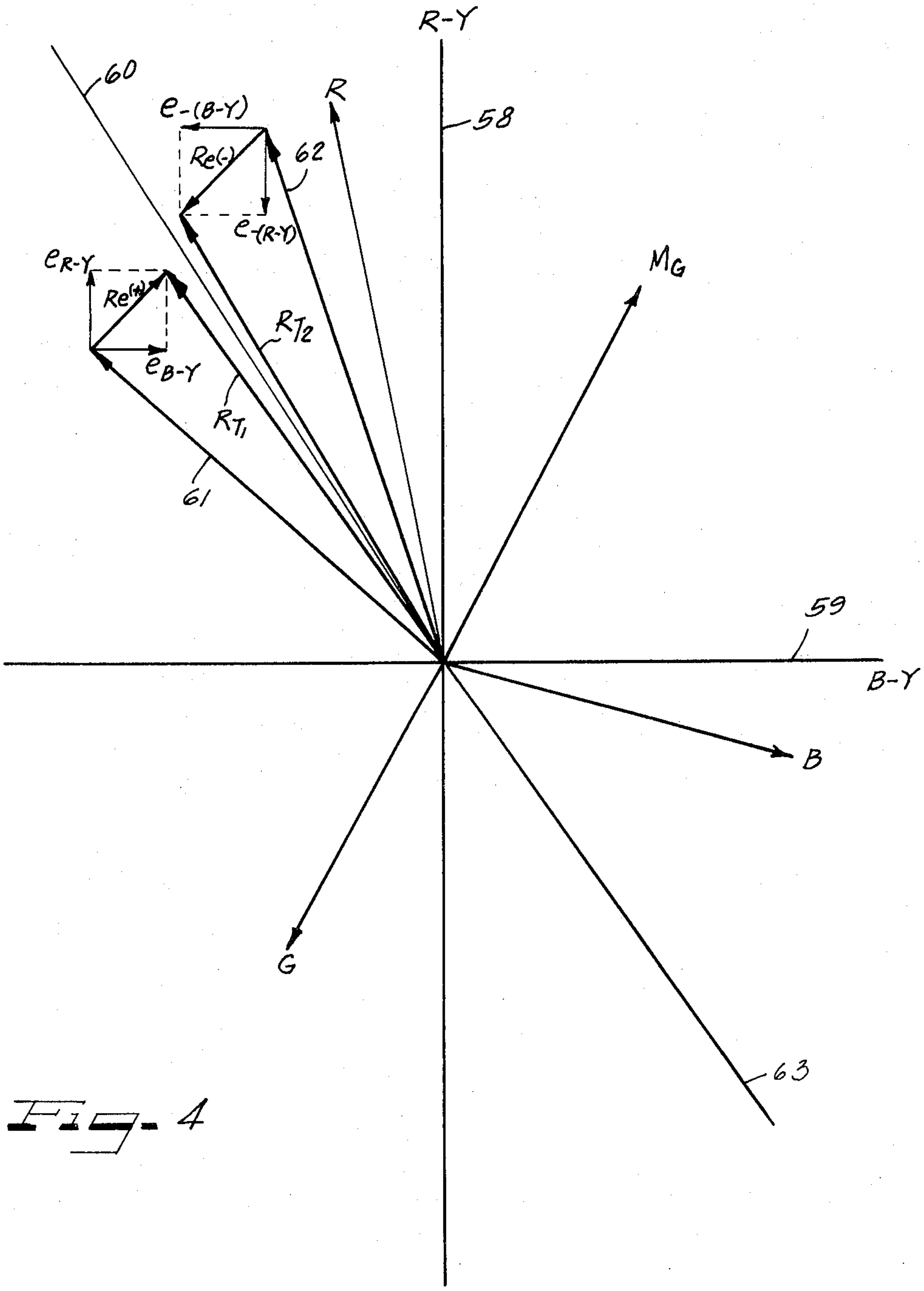
FIG. 4 illustrates a color chart.

FIG. 4 illustrates a color chart with the R-Y phase being indicated at 90° and identified by the numeral 58 and the B-Y phase being indicated at 180° and identified by the numeral 59. The phase desired to be corrected to produce desirable flesh renditions is indicated generally by the numeral 60 and is positioned at approximately 57°. Should a chroma signal appear at the position indicated by the numeral 61, an error signal composed of a positive R-Y component and a positive B-Y component will be added to the chroma signal at the input to the demodulators to produce a resultant $R_e$ which when combined with the original chroma signal 61 produces a total resultant $RT_1$.

Similarly, when the chroma signal falls in the vicinity of the vector marked 62, an error signal composed of a negative R-Y component and a negative B-Y component will be added to the chroma signal at the input to the demodulators to produce a resultant signal $R_e$ which when added to the original chroma signal vector 62 will produce a resultant $RT_2$. It is noted that both $RT_1$ and $RT_2$ represent shifted chroma signals, signals which have been shifted from an original phase to a phase position which is closer to the desired or predetermined phase of 57° indicated by the numeral 60.

The present invention is not limited to the selection of any one phase, and the principles applied may be used to correct any desired hue.

I claim as my invention:

1. In a color television receiver having means for demodulating a received chroma signal to display on the raster of a picture tube, an automatic tint control circuit comprising:

means for selecting a given proportion of each of two color difference signal to determine a given hue about which automatic correction is required, means for adding the given proportions of said color difference signals to produce an error signal, said given proportions of said color difference signals being chosen to cause said error signal to have a first polarity when said chroma signal in the region of said given hue is at a phase leading the phase of said given hue and a second polarity when said chroma signal in the region of said given hue is at a phase lagging the phase of said given hue, and means for combining the error signal with the chroma signal to shift the phase of the chroma signal in a direction toward the phase of said given hue.

2. An automatic tint control circuit in accordance with claim 1 wherein said given hue is selected generally to coincide with the hue of a selected flesh tone.

3. An automatic tint control circuit in accordance with claim 2 wherein the two color difference signals comprise the R-Y and B-Y signals.

4. An automatic tint control circuit in accordance with claim 3 wherein the error signal is coupled to said demodulating means for the R-Y and B-Y components respectively.

5. An automatic tint control circuit in accordance with claim 1 wherein said means for selecting said given proportions of each of said two color difference signals is adjustable to provide zero error signal when the chroma signal coincides with said given hue.

6. An automatic tint control circuit in accordance with claim 5 wherein said means for selecting said given proportions of each of said two color difference signals is adjustable to provide a positive error signal when the phase of said chroma signal is in the region of said given hue and is lagging the phase of said given hue and a negative error signal when the phase of said chroma signal is leading the phase of said given hue.

7. An automatic tint control circuit in accordance with claim 1 wherein means are provided to substantially cancel said error signal when said chroma signal is at a phase to produce a substantially greenish hue at a saturation level above a predetermined value.

8. An automatic tint control circuit in accordance with claim 1 wherein means are provided to substantially cancel said error signal during the time portion of said chroma signal occupied by a horizontal blanking pulse.

9. In a color television receiver having at least R-Y and B-Y color demodulators for demodulating a received chroma signal and having at least R-Y and B-Y color difference amplifiers for producing a display on the raster of a picture tube, an automatic tint control circuit comprising:

means for sampling a given proportion of the outputs of said color difference amplifiers and for adding said sampled signals to produce a resultant signal, said given proportion being determined by phase angles of the preselected hue about which phase correction is desired, and means for coupling a preselected portion of said resultant signal to the inputs of said R-Y and B-Y color demodulators to produce said phase correction of the chroma signal.

10. An automatic tint control circuit in accordance with claim 9 wherein said means for coupling the preselected portion of said combined signal to the inputs of said R-Y and B-Y color demodulators comprises first and second electronic switching means, each having a portion of said resultant signal as an input, said first electronic switching means having an output of a polarity which is opposed to the polarity of the output of said second electronic switching means, means for combining the outputs of said first and second electronic switching means, and means for coupling these combined outputs to the input of said color demodulators.

11. An automatic tint control circuit in accordance with claim 10 wherein said first electronic switching means is biased to be conducting for substantially all values of said resultant signal and wherein said second electronic switching means is biased to be conducting time intervals when said chroma signal reflects a relatively high saturated greenish hue and when said resultant signal includes the horizontal blanking pulse.

* * * * *